Patented Nov. 20, 1951

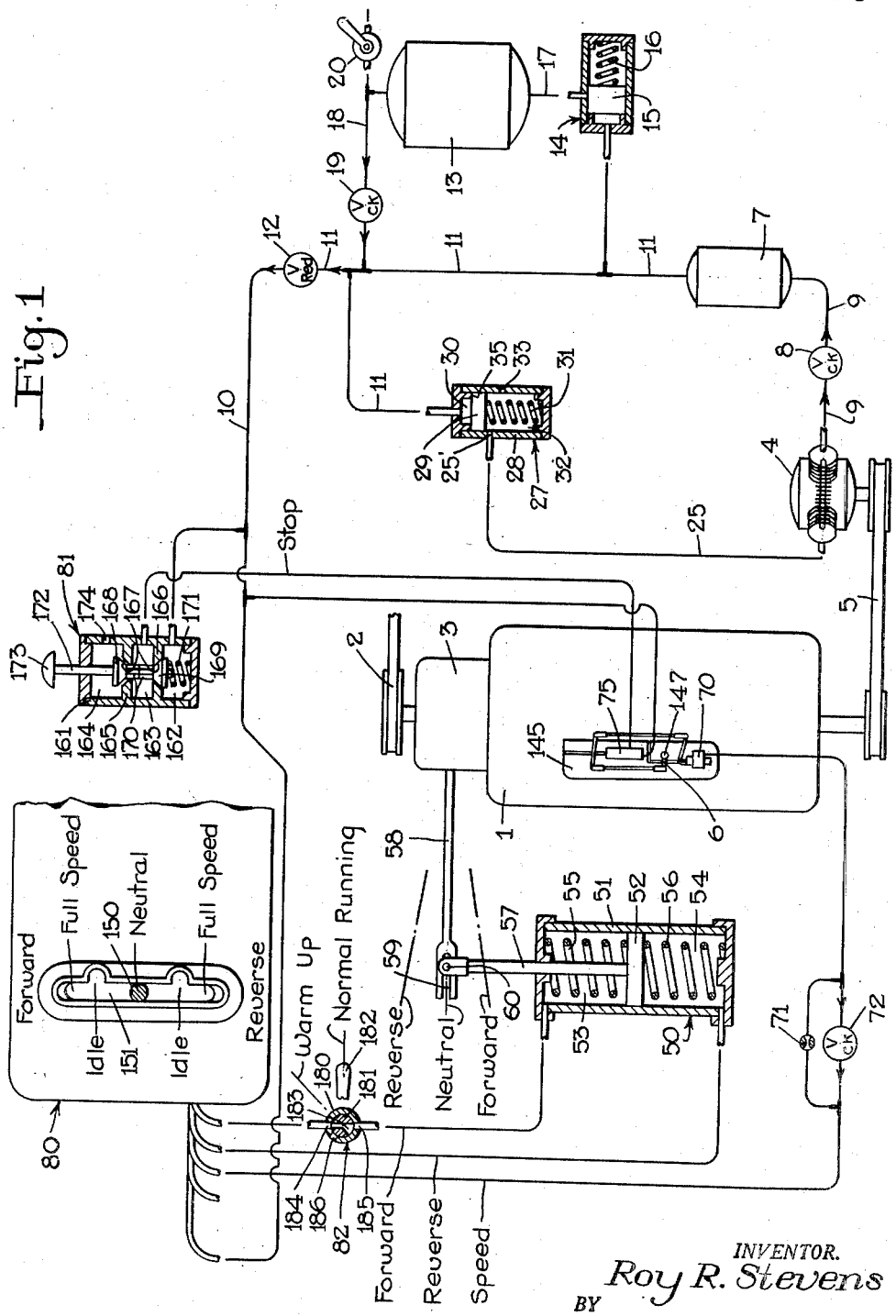

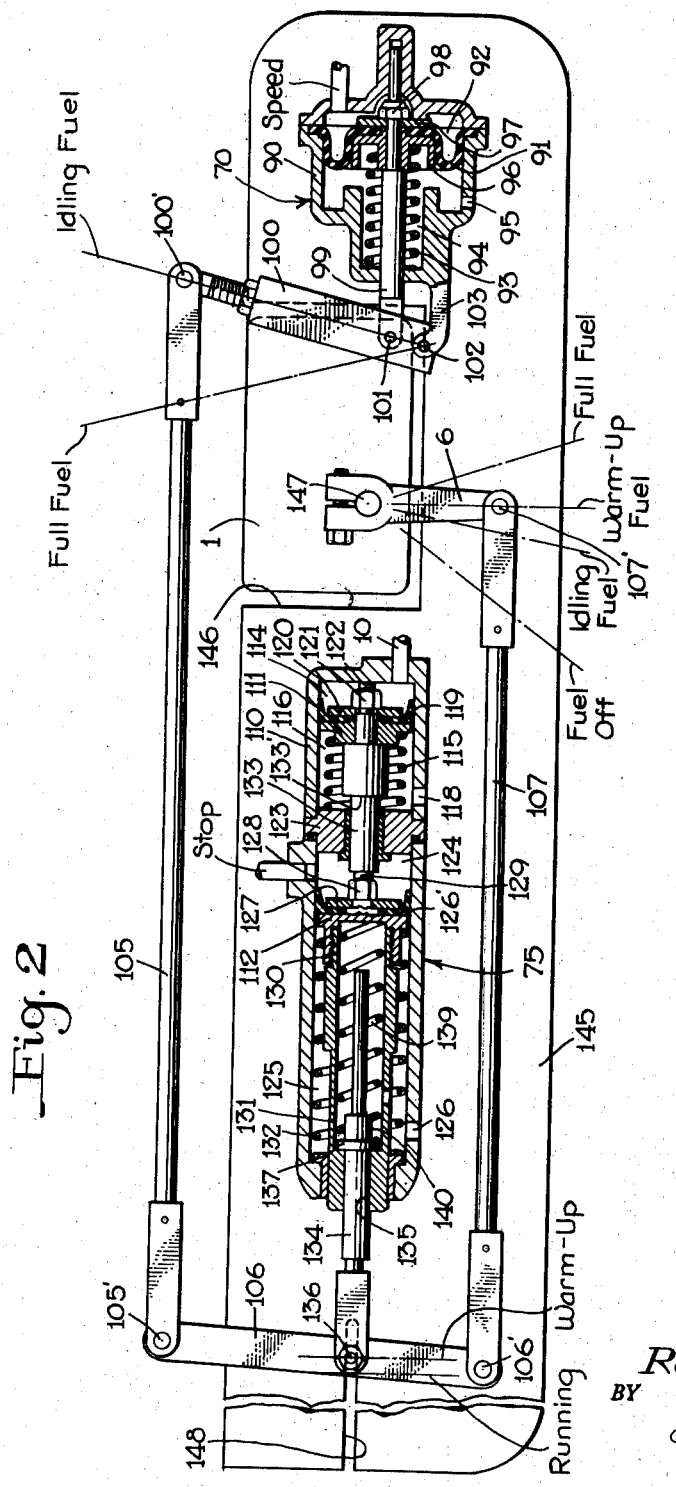

2,575,983

UNITED STATES PATENT OFFICE 2,575,983

FLUID PRESSURE CONTROL APPARATUS FOR ENGINES

Roy R. Stevens, Forest Hills, Pa., assignor to Westinghouse Air Brake Company, a corporation of Pennsylvania Application November 19, 1949, Serial No. 128,411

12 Claims. (Cl. 123—103)

This invention relates to control apparatus and more particularly to fluid pressure control apparatus for engines.

In the usual fluid pressure control systems for controlling supply of fuel to an engine, when fluid under pressure for the control system is generated by a compressor driven by the engine being controlled, the control system may become depleted of fluid under pressure during shut down of the engine, so that at time of subsequent starting, the system would be ineffective to control supply of fuel to the engine until fluid under pressure had been restored to the system by operation of the engine driving the compressor.

In view of the above, it is a prime object of this invention to provide a fluid pressure control system which will function to effect supply of a sufficient amount of fuel to the engine during starting, when the control system is depleted of fluid under pressure, as will run the engine at a relatively high warm-up speed for warming up the engine and for rapidly regenerating fluid under pressure for such control system.

In accordance with this object, I have provided positioning means which will respond to an undesired reduction in pressure in the source of working fluid for the control system to effect movement of the usual engine fuel control lever to a warm-up position until such pressure has been built up to a desirable value, in response to which the positioning means will be rendered ineffective, to allow for regulation of fuel supply to the engine by the usual fluid pressure means.

Other objects and advantages will become apparent from the following more detailed description of the invention.

Referring to the drawings, Fig. 1 is a schematic view, partly in outline and partly in section, of a fluid pressure control apparatus embodying the invention associated with an internal combustion engine; and Fig. 2 is a cross-sectional view showing details of a fuel control mechanism comprised in the control apparatus shown in Fig. 1.

Description

Referring to Fig. 1, a prime mover, such as an internal combustion engine 1, is adapted to drive a device to be driven (not shown) through the medium of such as a belt and pulley arrangement 2 and a transmission 3 (shown in outline), and also to drive a compressor 4 through such as a belt and pulley arrangement 5. A fuel control lever 6 on the engine is operatively connected to engine fuel control valve means (not shown) via a fuel control shaft 147 so that by movement of lever 6 to various positions the amount of fuel supplied to the engine may be varied, as will be described hereinafter.

According to a feature of the invention, a relatively small reservoir 7 is provided which rapidly may be charged by the compressor 4 to control system pressure by way of a check valve 8 and pipe 9 to act as an initial source of fluid under pressure for the control system. The reservoir 7 is connected to a control supply pipe 10 by way of a pipe 11 and a reducing valve 12 which will maintain a control supply pressure of ninety pounds, for example, in the pipe 10. A second and larger reservoir 13 is provided to act as a source of fluid under pressure for auxiliary devices (not shown) as well as for the control system. The reservoir 13 is arranged to be charged with fluid under pressure from the compressor 4 by way of a pressure governor device 14 which, schematically, may comprise a piston valve 15 subject to pressure of fluid in pipe 11 on its one side and to force of a compression spring 16 on its opposite side. When pressure of fluid in the pipe 11 reaches one hundred and twenty pounds, for example, piston valve 15 will overcome spring 16 and move to uncover a port connecting the pipe 11 to a pipe 17 connected to the reservoir 13. When pressure of fluid in pipe 11 drops below one hundred twenty pounds, as a chosen example, the piston valve 15 will be returned by spring 16 to the position in which it is shown in the drawing, closing off the reservoir 13 from the pipe 11. The reservoir 13 is also constantly connected to the pipe 11 by way of a pipe 18 and a check valve 19. A cock 20, in a branch of the pipe 18, provides for opening and closing the reservoir 13 to the auxiliary devices (not shown).

In the well-known manner, compressor unloader means (not shown) may be associated with the compressor 4 in such a manner as to render the compressor 4 ineffective to compress fluid when such as an unloader control pipe 25 is pressurized and effective to compress fluid for system supply when such control pipe 25 is vented. When the compressor unloader means are employed, the compressor 4 will continue to turn over so long as the engine is running.

To control operation of the compressor unloader means (not shown) by effecting supply and release of fluid under pressure to and from the unloader control pipe 25 in response to pressure changes in pipe 11 and therefore according to demand for supply of make-up to the reservoirs 7 and 13, the usual pressure governor device 27 is provided. For sake of illustration, schematically, the pressure governor device 27 may comprise a casing 28 having a piston valve 29 slidably disposed therein subject opposingly to pressure of fluid in a pressure chamber 30 at one side and to force of a compression spring 31 in a spring chamber 32 at the opposite side. Chamber 30 is constantly open to the pipe 11 and spring chamber 32 is constantly open to atmosphere by way of a port 33 in the casing. When pressure of fluid in chamber 30 drops below a certain pressure such as one hundred ninety pounds, for example, as fluid under pressure is used in the system, the piston valve 29 will be caused to assume a position in which it is shown in the drawing seated on an annular shoulder 35. When seated, valve 29 is so positioned as to expose a port 25' connected to the unloader control pipe 25, to the chamber 32 and thence to atmosphere via port 33. The unloader control pipe 25 thus will be vented when piston valve 29 is seated and the compressor unloader means (not shown) will be ineffective, calling for compression of fluid by the compressor 4 to make up fluid under pressure to the reservoirs 7 and 13. When seated on shoulder 35, an outer portion of the valve 29 is sealed off from exposure to pressure of fluid in chamber 30, reducing the effective area of said valve so that it will unseat at a pressure, such as two hundred fifteen pounds for example, which pressure is greater than the pressure at which it will seat when the entire area of the valve is exposed to such pressure. Upon unseating, that is, when pressure of fluid in pipe 11 and hence volume of fluid under pressure in reservoirs 7 and 13 have been restored to a desired value, the piston valve 29 will move past port 25', exposing same to chamber 30, whereupon fluid under pressure from pipe 11 will flow to the unloader control pipe 25 to render the compressor unloader (not shown) effective.

The control apparatus further comprises a fluid pressure actuator 50 for shifting the transmission 3. The actuator 50 schematically may comprise a hollow cylindrical casing 51 having a piston 52 slidably disposed therein subject opposingly to pressures of fluid in respective pressure chambers 53 and 54 at its opposite sides and to force of respective compression springs 55 and 56 disposed in chambers 53 and 54, respectively. Chambers 53 and 54 are connected to "Forward" and "Reverse" control pipes which provide for supply and release of fluid under pressure to and from these chambers. The piston 52 is operatively connected to the transmission 3 (shown in outline) by means of a piston rod 57 and such as a lever 58 which may be provided with such as an open ended slot 59 at its one end for receiving a pin 60 attached to the projecting end of the piston rod 57. Lever 58 is adapted to assume one of three positions "Neutral," "Forward," or "Reverse," indicated in the drawing by dot and dash lines so titled, and in which the transmission 3 is conditioned to disengage the drive pulley 2 from the engine, drive the pulley 2 in one direction, or to drive the pulley 2 in its opposite direction, respectively. When fluid under pressure is vented from both the "Forward" and "Reverse" control pipes, the piston 52 will be caused by action of springs 55 and 56 to assume the position in which it is shown in the drawing with the lever 58 disposed in its "Neutral" position. When fluid under pressure is supplied to the "Forward" control pipe with the "Reverse" control pipe vented, the piston 52 will be caused to overcome the balance of forces of springs 55 and 56 and move to a position in the direction of chamber 54 in which the lever 58 will be caused to assume its "Forward" position. Upon subsequent venting of fluid under pressure from the "Forward" control pipe with the "Reverse" control pipe so vented, the piston 52 will again return to its neutral position in which it is shown in the drawing, with the lever 58 being consequently, returned to its "Neutral" position. When fluid under pressure is supplied to the "Reverse" control pipe with the "Forward" control pipe vented, the piston 52 will move in the direction of chamber 53 to a position in which the lever 58 attains its "Reverse" position. Subsequent release of fluid under pressure from the "Reverse" control pipe along with the "Forward" control pipe will allow springs 55, 56 to return the piston 52 and lever 58 to "Neutral."

For adjusting position of the fuel control lever 6 during normal running operation of the engine a fluid pressure actuator device 70 is provided. As will be described in detail hereinafter, device 70 is arranged to respond to variations in pressure of fluid effected in a "Speed" control pipe by way of a choke 71 and check valve 72 inserted in said control pipe.

According to a feature of the invention, a combined stop and warm-up cylinder device 75 is associated with the actuator device 70 and operatively connected to the fuel control lever 6 through linkage common to both, as will be described, in detail hereinafter.

For controlling selective supply and release of fluid under pressure to and from the "Forward" and "Reverse" control pipes and for effecting variations in pressure of fluid in the "Speed" control pipe, an operator's control device 80 is provided. For controlling the stop portion of the cylinder device 75, a push button valve device 81 is provided. A warm-up valve device 82 in the form of an angle cock is inserted in the "Forward" control pipe for reasons which will be set forth hereinafter.

Referring to Fig. 2, the actuator device 70 may comprise a casing 90 having a diaphragm 91 clamped therein subject opposingly to pressure of fluid in a pressure chamber 92 at its one side and to force of a compression spring 93 disposed in a spring chamber 94 at its opposite side. Chamber 92 is connected to the "Speed" control pipe and chamber 94 is constantly open to atmosphere by way of a port 95 in the casing. Secured for reciprocable movement with the diaphragm 91 by means of follower elements 96, 97 and a nut 98 is an actuator rod 99 which extends through chamber 94 and outwardly through an accommodating opening in the casing. A lever 100 is provided to which the rod 99 is operatively connected by means of such as a pin 101. The lever 100 is pivotally connected at one end by means of a pin 102 to a projecting arm 103 fixed to the casing 90 of the actuator device. Through regulation in pressure of fluid in the pressure chamber 92 the diaphragm 91 and rod 99 will be caused to assume positions in the direction of chamber 94 according to the degree of such pressure. The lever 100 in turn will assume angular positions about pin 102 corresponding to positions of the rod 99 until attainment of an extreme position such as "Full Fuel," indicated by a dot and dash line so titled in the drawing. By controlled release of fluid under pressure from the pressure chamber 92, lever 100 may be caused to assume positions toward and including the "Idling Fuel" position in which it is shown in the drawing as spring 93 moves the rod 99 and diaphragm 91 toward and to the positions in which they are shown in the drawing. The lever 100 is operatively connected to the engine fuel control lever 6 through the medium of a link 105, a lever 106, and a link 107. A pin 100' connects the other end of lever 100 to link 105; a pin 105' connects link 105 to lever 106; a pin 106' connects lever 106 to link 107; and, a pin 107' connects link 107 to the fuel control lever 6.

The combined stop and warm-up cylinder device 75 may comprise a casing 110 having a warm-up piston 111 and a stop piston 112 reciprocably disposed therein. The piston 111 is subject opposingly to pressure of fluid in a pressure chamber 114 connected to a supply pipe 10 at its one side and to force of a compression spring 115 disposed in a chamber 116 at its opposite side. Chamber 114 is connected to a branch of the pipe 10 so that it will contain fluid from reservoirs 7 and 13 at the pressure provided by the reducing valve device 12. The chamber 116 is constantly open to atmosphere by way of a port 118 in the casing. A resilient sealing cup 119 is clamped to the piston 111 by means of a retaining ring 120 and nut 121 to prevent fluid under pressure from the pressure chamber 114 from leaking past the piston to the chamber 116, thence to atmosphere. The nut 121 is in screw-threaded attachment with a rod 122 centrally attached to piston 111 and extending through the cup 119 and ring 120 into the chamber 114. The spring 115 urges piston 111 in the direction of chamber 114 to a rest position in which it is shown in the drawing, defined by engagement of rod 122 with an end wall of the casing.

A partition 123, clamped between two portions of the casing 110, separates the non-pressure chamber 116 from a pressure chamber 124 at one side of the piston 112 which is connected to a "Stop" control pipe. At the opposite side of the piston 112 there is a chamber 125 which is constantly open to atmosphere by way of a port 126 in the casing 110. To prevent leakage of fluid under pressure from chamber 124 past the piston 112 to chamber 124, a sealing cup 126' is provided. The sealing cup 126' is clamped between the piston 112 and an annular member 127 disposed in chamber 124. The member 127 is held in place by a nut 128 which is in screw-threaded attachment with a rod 129 centrally attached to piston 112 and extending through the cup 126' and member 127 into the chamber 124. The piston 112 is provided with an integrally formed sleeve member 130 which is in screw-threaded attachment with one end of a tubular member 131 which extends through chamber 125 and outwardly through one end of the casing 110. A compression spring 132, encircling member 131 and disposed in chamber 125, is arranged to urge the piston 112 to a rest position in which it is shown in the drawing, defined by contact of rod 129 with a piston rod 133 attached to the piston 111. Rod 133 extends through an opening in partition 123, and a bushing pressed into the opening provides a sleeve in which the rod 133 may slide with such close fit as will prevent substantial leakage of fluid under pressure from the chamber 124 into chamber 116. A rod 134, slidable within an opening 135 in member 131, is pivotally connected at its one end to lever 106 by means such as a fulcrum pin 136 to act as a fulcrum for said lever. The rod 134 is provided with a collar 137 disposed within member 131. A compression spring 139 within member 131 is arranged to urge the rod 134 to the position in which it is shown in the drawing with collar 137 in engagement with an annular shoulder 140 formed in member 131.

According to another feature of the invention, the actuator device 70, the combined stop and warm-up cylinder device 75 and the linkage for connecting same to the engine fuel control lever 6 are all carried by a base member 145 adapted as a unit to be removably secured to the engine 1. A recess 146 allows the base member 145 to be fit around a projecting portion of the engine through which the fuel control shaft 147 extends. The base member 145 provides a mounting surface for the devices 70 and 75 which allows for free movement of the linkage, and facilitates standardization of the equipment which may then be mounted on engines of various make and contour. A slot 148 in the base member 145 serves as a guide for the fulcrum pin 136 so that the rod 134 will not be subjected to a bending action during operation of the apparatus, thereby assuring facile movement of the rod 136 in opening 135.

The operator's control device 80 may be substantially like that shown and described in detail in United States Patent No. 2,413,390, issued to me December 31, 1946, and assigned to the assignee of the present application. In "Neutral" position of an operator's handle 150 in a slot 151, the device 80 is conditioned to vent the "Speed," "Forward," and "Reverse" control pipes to atmosphere. When the operator's handle 150 is moved out of "Neutral" position in slot 151 to positions in the direction indicated by the legend "Forward," the "Forward" control pipe is connected to the control supply pipe 10 while the "Reverse" control pipe remains vented. When handle 150 is moved to positions on the "Reverse" side of "Neutral" position, the "Reverse" control pipe is connected to the control supply pipe 10, while the "Forward" control pipe remains vented to atmosphere. In the slot 151, at either side of "Neutral" position, the handle 150 may be moved to and between respective "Idle" and "Full Speed" positions, indicated in the drawing by dot-and-dash lines so titled, to effect variations in pressure of fluid in the "Speed" control pipe between a minimum value corresponding to the "Idle" position and a maximum value corresponding to the "Full Speed" position. Upon return of handle 150 to "Neutral" position, the device 80 will effect venting of the "Forward," "Reverse," and "Speed" control pipes to atmosphere.

The push button valve device 81 for controlling stopping of the engine, schematically, may comprise a casing 161 having a supply chamber 162, a delivery chamber 163, and an exhaust chamber 164 formed therein. A partition 165 separates the delivery chamber 163 from the exhaust chamber 164 and a partition 166 separates the delivery chamber 163 from the supply chamber 162. Each of the partitions 165 and 166 is provided with a central opening 167 and a valve seat encircling the opening within chamber 164 or 162, the two seats being provided to accommodate valves 168 and 169 contained respectively in said chambers for controlling communication through the openings 167 between the delivery chamber 163 and, respectively, the exhaust chamber 164 and the supply chamber 162. Each of the valves 168 and 169 is attached to a fluted stem 170 which is slidable within the respective openings 167. The stems 170 extend into and meet in the delivery chamber 163. A compression spring 171, disposed in the supply chamber 162, is arranged to urge the valve 169 to its seated position in which it is shown in the drawing and to urge the valve 168 to its unseated position in which it is shown in the drawing. To the valve 168, is attached a stem 172 which extends through the exhaust chamber 164 and through an opening in the casing to the exterior thereof. A push button 173 is attached to the outer end of the stem 172, so that manually the action of spring 171 may be overcome to seat the valve 168 and to unseat the valve 169. When pressure exerted manually on the push button 173 is removed, the spring 171 will reseat valve 169 and unseat the valve 168. When valves 168 and 169 are open and closed, respectively, the delivery chamber 163 is open to the exhaust chamber 164 and closed to the supply chamber 162. Conversely, when the valves 168 and 169 are closed and open, respectively, that is, when button 173 is depressed, the delivery chamber 163 is closed to exhaust chamber 164 and open to the supply chamber 162.

In the push button valve device 81, the supply chamber 162 is connected to the control supply pipe 10, the delivery chamber 163 is connected to the "Stop" control pipe, and the exhaust chamber 164 is constantly open to atmosphere by way of such as a port 174.

The warm-up valve device 82, schematically, for sake of illustration, may comprise a casing 180 having a rotary valve 181 therein which is operable by means of a handle 182 to either one of two positions indicated in the drawing by dot-and-dash lines titled "Warm-up" and "Normal Running," respectively. In "Normal Running" position, in which it is shown in the drawing, a passage 183 through valve 181 is in registry with ports 184 and 185 connected to portions of the "Forward" control pipe which lead to the operator's control device 80 and to the actuator 50, respectively. In "Warm-Up" position, the passage 183 in valve 181 is out of registry with port 184, in registry with a port 186 open to atmosphere and in registry with the port 185, so that the portion of the "Forward" control pipe connected to the actuator 50 is vented via the warm-up valve device 82.

Operation

Assume that the engine 1 is stopped; assume that reservoirs 7 and 13 are devoid of fluid under pressure so that there is no fluid under pressure in the control supply pipe 10; assume that the operator's handle 150 of the operator's control device 80 is in its "Neutral" position, with "Forward," "Reserve," and "Speed" control pipes consequently vented; assume that push button stem 172 in valve device 81 is fully extended so that the "Stop" control pipe is vented; and assume that the warm-up valve device 82 is in its "Normal Running" position in which it is shown in the drawing.

With no fluid under pressure in the control supply pipe 10, the pressure chamber 114 in the stop and warm-up cylinder device 75 will be void of fluid under pressure as will be the pressure chamber 124, by way of the vented "Stop" control pipe. The chamber 92 in actuator device 70 is vented by way of the "Speed" control pipe.

According to a feature of the invention, with the chamber 92 in actuator device 70 vented, the diaphragm 91, rod 99, and lever 100 will be in the positions in which they are shown in the drawing as will be the pistons 111 and 112, with rod 129 seated against the rod 133 attached to piston 111 and rod 122 seated on the casing. With the piston 112 so positioned, the member 131 and rod 134 will be in the respective positions in which they too are shown in the drawing. With rod 134 so positioned, the fulcrum pin 136, which acts as a fulcrum for lever 106, will be disposed in what may be called its "Warm-up" position indicated in the drawing by a dot-and-dash line so titled.

With the pin 136 in its "Warm-up" position, by virtue of the fact that chamber 114 in warm-up portion of device 75 is void of fluid under pressure along with the system supply reservoirs 7 and 13, and with the lever 100 in its "Idling Fuel" position, by virtue of the fact that chamber 92 in actuator device 70 is vented by way of the "Speed" control pipe, the lever 106, and therefore link 107 will assume the respective positions in which they are shown in the drawing, holding the fuel control lever 6 in a "Warm-Up Fuel" position indicated in the drawing by a dot-and-dash line so titled. In "Warm-Up-Fuel" position of the fuel control lever 6, the fuel control means (not shown) controlled by the lever 6 are properly conditioned to effect supply of an amount of fuel to the engine when same is started which is sufficient to operate same at a speed greater than idling speed for warm-up. During the time that the engine is operated at warm-up fuel, the compressor 4 will be driven at a speed which will charge the reservoirs 7 and 13, in fashion as aforedescribed, to furnish fluid under pressure to the control supply pipe 10. After the small reservoir 7 has been charged, sufficient fluid at adequate pressure will be available to the control supply pipe 10 and pipe 11 for use by the operator's control device 80 for effecting remote control of the actuator device 70 and thereby speed of the engine as the operator may desire, which control was heretofore impossible with the control supply pipe 10 void of fluid under pressure, since obviously the pressurization of the "Speed" control pipe, necessary to operate actuator 70, could not then be effected. When reservoir 7 becomes charged with fluid under pressure through warm-up operation of the engine, the pipe 11 and hence the chamber 114 in the warm-up portion of cylinder device 75 will also become so pressurized. As a result of pressurization of the chamber 114, the warm-up piston 111 will move in the direction of chamber 116, against action of the spring 115, to a position defined by engagement of an annular shoulder 133' on rod 133 with the partition 123. Through engagement of rods 129 and 133, movement of piston 111 will carry with it the piston 112 and attached member 131 against action of the spring 132. Movement of the member 131 with piston 112 will carry the spring 139 with it, which spring will in turn urge and effect movement of the rod 134 with it until the pin 136 attains a "Running" position corresponding to the position of piston 111 defined by engagement of shoulder 133' with partition 123. The pin 136 in moving from its "Warm-Up" position to its "Running" position will cause rocking of the lever 106 about the pin 105' in a clockwise direction, as viewed in the drawing, thereby causing the fuel control lever 6 to be moved from its "Warm-Up" position to its "Idling Fuel" position corresponding to the "Idling Fuel" position of the lever 100 of actuator device 70. So long as the control supply pipe 10 contains fluid at adequate pressure from the reservoir 7 or 13, the fulcrum pin 136 acting as fulcrum for the lever 106, will remain in its "Running" position, and position of the fuel control lever 6 will be effected in accord with position of the lever 100 through the medium of links 105, 107, and lever 106, by proper variation in pressure of fluid in the chamber 92 in actuator 70. It will be appreciated that with the engine running and with the control supply pipe 10 adequately pressurized, variation in pressure of fluid in the actuator device chamber 92 may be effected through the "Speed" control pipe by movement of the operator's handle 150 in device 80 to and between "Idle" and "Full Speed" positions at either side of "Neutral," as will be appreciated from previous description.

From the preceding, it will be apparent that according to one feature of the invention, automatic means have been provided in fluid pressure engine control apparatus which will so position the engine fuel control lever 6 when control supply pressure is depleted as will assure operation of the engine at a speed sufficient to effect rapid reestablishment of the control supply pressure through operation of the compressor driven by the engine, after which the above mentioned automatic means will respond to allow control of engine speed to be taken over by other fluid pressure manually operable control means which have been rendered effective by the reestablishment of control pressure.

When the warm-up valve 82 is in the "Warm-Up" position, in which it is shown in the drawing, the lever 58 cannot be moved to "Forward" position to cause engagement of a forward driving connection between the engine 1 and the belt and pulley arrangement 2. After the control supply pressure has been reestablished during engine warm-up, unintended driving of the device to be driven (not shown) in its forward direction is thus prevented, should the operator's handle 150 in device 80 be in the "Forward" zone at the time. The warm-up valve 82 might be arranged to disestablish communication through the "Reverse" control pipe at the same time to prevent engagement of the reversing clutches for the same reason, but it is believed that the possibility of the handle 150 being in the "Reverse" zone at the time of starting and warm-up is remote.

To allow for movement of the lever 58 to "Forward" position to establish a forward driving connection between the engine 1 and the belt and pulley arrangement 2, the handle 182 of the warm-up valve device 82 may be moved from its "Warm-Up" position to its "Normal Running" position in which it is shown in the drawing. In "Normal Running" position, communication is again established through the "Forward" control pipe between the actuator 50 and the operator's control device 80, as will be appreciated from previous description.

With the engine running in either direction, the operator's handle 150 in the control device 80 may be moved to its "Neutral" position, thereby effecting venting of the "Speed" control pipe and whichever of the "Forward" and "Reverse" control pipes is charged at the time. With both the "Forward" and "Reverse" control pipes vented, the actuator 50 will return the lever 58 to "Neutral" position, thereby disengaging driving connection between the belt and pulley arrangement 2. Venting of the "Speed" control pipe will release fluid under pressure from the chamber 92 in the actuator device 70, allowing the spring 93 to return diaphragm 91 to the position in which it is shown in the drawing, and return the lever 100 to its "Idling Fuel" position. In moving to "Idling Fuel" position, the lever 100 will cause movement of the fuel control lever 6 to its corresponding "Idling Fuel" position, with the fulcrum pin 136 in its "Running" position in which it is held by piston 111 so long as the control supply pressure is maintained. With the fuel control lever 6 in its "Idling Fuel" position, sufficient fuel will be supplied to the engine for causing same to run at idling speed.

According to another feature of the invention, assume that at this time it is desired to stop the engine. This may be effected by depressing the push button 173 of valve device 81 to effect supply of fluid under pressure from the control supply pipe 10 to the chamber 124 in the cylinder device 75 by way of the "Stop" control pipe, as will be appreciated from previous description. In response to supply of fluid under pressure to the chamber 124, the stop piston 112 will move in the direction of the chamber 125, away from the rod 133, carrying the member 131 with it. In thus moving with the piston 112, the member 131 carries one end of the spring 139 with it while the opposite end of this spring 139 will maintain engagement of collar 137 with shoulder 140 as the rod 134 is thereby caused to move with member 131 and piston 112. In thus moving with member 131, the rod 134 will cause the lever 106 to rock in a clockwise direction about the pin 105', and, acting through the link 107, to move the fuel control lever 6 to a "Fuel Off" position indicated in the drawing by a dot-and-dash line so titled. In "Fuel Off" position of the fuel control lever 6, the fuel control means (not shown) controlled by lever 6 is so conditioned as to terminate supply of fuel to the engine for stopping same. The travel of the piston 112 is such that supply of fluid under pressure, as above described, to chamber 124 will cause movement of the fuel control lever 6 to its "Fuel Off" position regardless of the position of the actuator lever 100 which will usually be in its "Idling Fuel" position when the engine is stopped, but could be in such as its "Full Fuel" position, as an extreme example, without preventing the cut-off of fuel by operation of piston 112. After the fuel control lever 6 has attained its "Fuel Off" position, as above described, the piston 112 may continue to move with resultant over-travel of member 131, as the shoulder 140 will leave the collar 137 while the rod 134 remains stationary by virtue of further compression of the spring 139. By means of the spring connection between the piston 112 and the rod 134, the cylinder device 75 may be employed without modification on engines having greater or less fuel control lever travel to attain their respective "Fuel Off" positions and without causing excessive shock and stress on the lever and linkage.

*Summary*

It will now be seen that I have provided fluid pressure control apparatus for controlling supply of fuel to an engine which drives a compressor that generates the fluid under pressure for the control system, which apparatus will function automatically to effect supply of a sufficient amount of fuel during engine starting when the control system is depleted of fluid under pressure as will run the engine for rapid regeneration of such fluid under pressure.

Having now described the invention, what I claim as new and desire to secure by Letters Patent, is:

1. Engine fuel control apparatus comprising in combination, a fluid pressure supply reservoir, a fluid compressor, a fluid pressure delivery pipe for said compressor connected to said reservoir for conveying compressed fluid from said compressor to said reservoir, a governor device responsive to pressure of fluid in said pipe at less than a chosen degree to close communication from said pipe to said reservoir, a fuel control lever having an engine idling position, a full fuel position and an intermediate fuel position, a fluid pressure operated actuator adjustable in accordance with the pressure of such fluid between a minimum pressure and said chosen degree of pressure to regulate the position of said lever between idle and full fuel positions, respectively, a control device for supplying fluid under pressure from said pipe to said actuator and for releasing fluid under pressure therefrom, and means controlled by pressure of fluid in said pipe for moving said lever relative to said actuator to said intermediate position upon depletion of fluid under pressure in said pipe.

2. In combination with a source of fluid under pressure, a fluid pressure motor adapted to assume positions in accordance with variations in pressure of fluid, fluid pressure control means to effect said variations, positionable means having positions corresponding to positions of said motor, linkage means operatively connecting said motor to said positionable means, and means associated with said positionable means responsive to a certain reduction in pressure of fluid in said source to disestablish correspondence between position of said positionable means and position of said motor and responsive to reestablishment of fluid under pressure in said source to reestablish said correspondence.

3. In combination with a source of fluid under pressure, of a fluid pressure motor adapted to assume adjusted positions between one and another limits of travel in response to variations in pressure of fluid in a control pipe between maximum and minimum pressures, respectively, a positionable means adapted to assume positions corresponding to said adjusted positions, linkage means operatively connecting said motor to said positionable means, control means utilizing fluid under pressure from said source to effect said variations, and means associated with said linkage means responsive to depletion of fluid under pressure in said source to effect movement of said positioned means to a position in advance of the position of said motor and responsive to charging of said source with fluid under pressure to effect movement of said positioned means to its position corresponding to position of said motor.

4. The combination with an engine, of a fuel control lever adjustable to and between an idling fuel position and a full fuel position for effecting regulation in supply of fuel to the engine accordingly, a fluid compressor operably connected to said engine, a reservoir adapted to receive and store fluid under pressure from said compressor, a control pipe, motor means responsive to variations in pressure of fluid in said control pipe between a minimum pressure and a maximum pressure to effect movement of said fuel control lever to and between its idling fuel position and its full fuel position, respectively, control means utilizing fluid under pressure from said reservoir to effect said variations, and means associated with said motor means responsive to depletion of said reservoir of fluid under pressure to effect movement of said fuel control lever to a position intermediate its idling fuel position and its full fuel position.

5. The combination with an engine, of a fuel control lever adjustable to and between an idling fuel position and a full fuel position to effect regulation in supply of fuel to said engine accordingly and adjustable to a fuel off position to terminate such supply, a fluid compressor operably connected to said engine, a reservoir to receive and store fluid under pressure from said compressor, a control pipe, motor means responsive to variations in pressure of fluid in said control pipe between a minimum pressure and a maximum pressure to effect movement of said fuel control lever to and between its idling fuel position and its full fuel position, respectively, control means utilizing fluid under pressure from said reservoir to effect said variations, a stop control pipe, stop piston means responsive to supply of fluid under pressure to said stop control pipe to effect movement of said fuel control lever to its fuel off position, warm-up piston means operable through the medium of said stop piston means in response to reduction in pressure of fluid in said reservoir to effect movement of said fuel control lever to a position intermediate its idling fuel position and its full fuel position, and valve means to control supply of fluid under pressure from said reservoir to said stop control pipe.

6. The combination with a source of fluid under pressure, of a fuel control lever having positions corresponding to amount of fuel to be supplied to an engine, an actuator lever also having positions corresponding to amount of fuel to be supplied to an engine, an intermediate lever, a fulcrum for said intermediate lever, a first link operably connecting one end of said intermediate lever to said actuator lever, a second link operatively connecting the opposite end of said intermediate lever to said fuel control lever, means utilizing fluid under pressure from said reservoir for effecting movement of said actuator lever to move said fuel control lever, and means responsive to depletion of said reservoir of fluid under pressure to adjust position of said fulcrum so as to advance position of said fuel control lever relative to position of said actuator lever and responsive to establishment of fluid under pressure in said reservoir to adjust position of said fulcrum so as to assure coincidence between position of said fuel control lever and position of said actuator lever.

7. In combination, with a source of fluid under pressure, a first cylinder, a second cylinder aligned with said first cylinder, first piston means slidably disposed in said first cylinder dividing it into a first fluid pressure chamber constantly connected to said source and a first atmospheric chamber, a first compression spring disposed in said atmospheric chamber urging said first piston means in the direction of said first fluid pressure chamber, a first piston rod secured to said first piston means extending through said first atmospheric chamber, second piston means slidably disposed in said second cylinder dividing same into a second fluid pressure chamber and a second atmospheric chamber, second compression spring means disposed in said second atmospheric chamber arranged to urge said second piston means toward engagement with said first piston rod, a member attached for movement with said second piston means and extending outwardly of said second cylinder, a rod element within said member extending outwardly thereof, a stop element associated with said rod element for engagement with said member, said rod element being adapted at its outer end for operative connection with means to be actuated, third spring means urging said stop element toward engagement with said member, and valve means operable to either connect said second fluid pressure chamber to said source or to vent said second fluid pressure chamber to atmosphere.

8. Fluid pressure adjusting mechanism comprising two coaxially arranged cylinders, a piston in each cylinder, one piston being subject at its one side to fluid under pressure in one chamber and the other being subject on its same side to pressure of fluid in another chamber, a spring opposing movement of each piston by fluid under pressure, a rod projecting from one of the two adjacent sides of the two pistons for engagement with the other piston to move said other piston upon movement of said one piston by fluid under pressure in said one chamber, a rod to be actuated by said other piston arranged coaxially therewith, and a resilient operating connection between said other piston and said rod.

9. In combination with an engine and a fuel control lever therefor, of a base member mounted on said engine adjacent to said fuel control lever, fluid pressure actuator means mounted on said base member, mechanical linkage operatively connecting said fluid pressure actuator means to said fuel control lever, and warm-up means mounted on said base member operatively connected to said linkage for actuating said fuel control lever to positions in advance of the position dictated by said actuator means.

10. In combination with an engine and a fuel control lever therefor, of a base member mounted on said engine adjacent to said fuel control lever, fluid pressure actuator means mounted on said base member, mechanical linkage operatively connecting said fluid pressure actuator means to said fuel control lever, warm-up means mounted on said base member operatively connected to said linkage for actuating said fuel control lever to positions in advance of the position dictated by said actuator means, and stop means mounted on said base member operatively connected to said linkage for actuating said fuel control lever to a position in retard of the position dictated by said actuator means and said warm-up means.

11. In combination with an engine, a fuel control lever therefor, and a source of fluid under pressure dependent upon operation of said engine, of a base member mounted on said engine adjacent to said fuel control lever, fluid pressure actuator means mounted on said base member, operator's control means employing fluid under pressure from said source to effect operation of said actuator means, mechanical linkage operatively connecting said actuator means to said fuel control lever, warm-up means mounted on said base member operatively connected to said linkage means and responsive to a certain reduction in pressure of fluid in said source to effect movement of said fuel control lever to a position in advance of position dictated by said actuator means, and stop means also mounted on said base member operatively connected to said linkage to effect movement of said fuel control lever to a position in retard of position dictated by said actuator means and warm-up means, and valve means employing fluid under pressure from said source to effect operation of said stop means.

12. Apparatus adapted to be mounted as a unit on an engine for adjusting the fuel control element of said engine through a range of travel from a fuel off position to a full fuel position and including an intermediate or idling position, said apparatus comprising in combination, a base member adapted to be removably secured to the engine, a fluid pressure actuator mounted on said base member, means including a lever connecting said actuator to said fuel control element for rendering said actuator operable to adjust said fuel control member out of said idling position in the direction of said full fuel position in proportion to the pressure of such fluid, fulcrum means for said lever, a motor mounted on said base member carrying said fulcrum means and comprising two coaxially arranged pistons, one operable by fluid under pressure to actuate said lever to move said fuel control element to said fuel off position and the other cooperable, when subject to fluid under pressure, with said one, when fluid under pressure is released therefrom, to position said fulcrum means for rendering said fuel control element positionable by said actuator, and means responsive to release of fluid under pressure from both of said piston means to actuate said lever to move said fuel control means out of said idling position in the direction of said full fuel position.

ROY R. STEVENS.

REFERENCES CITED

The following references are of record in the file of this patent:

UNITED STATES PATENTS

| Number | Name | Date |
|---|---|---|
| 2,346,015 | Eaton | Apr. 4, 1944 |
| 2,364,352 | Dodson | Dec. 5, 1944 |
| 2,369,397 | Kostenick | Feb. 13, 1945 |
| 2,471,387 | Cooper | May 24, 1949 |